UNITED STATES PATENT OFFICE.

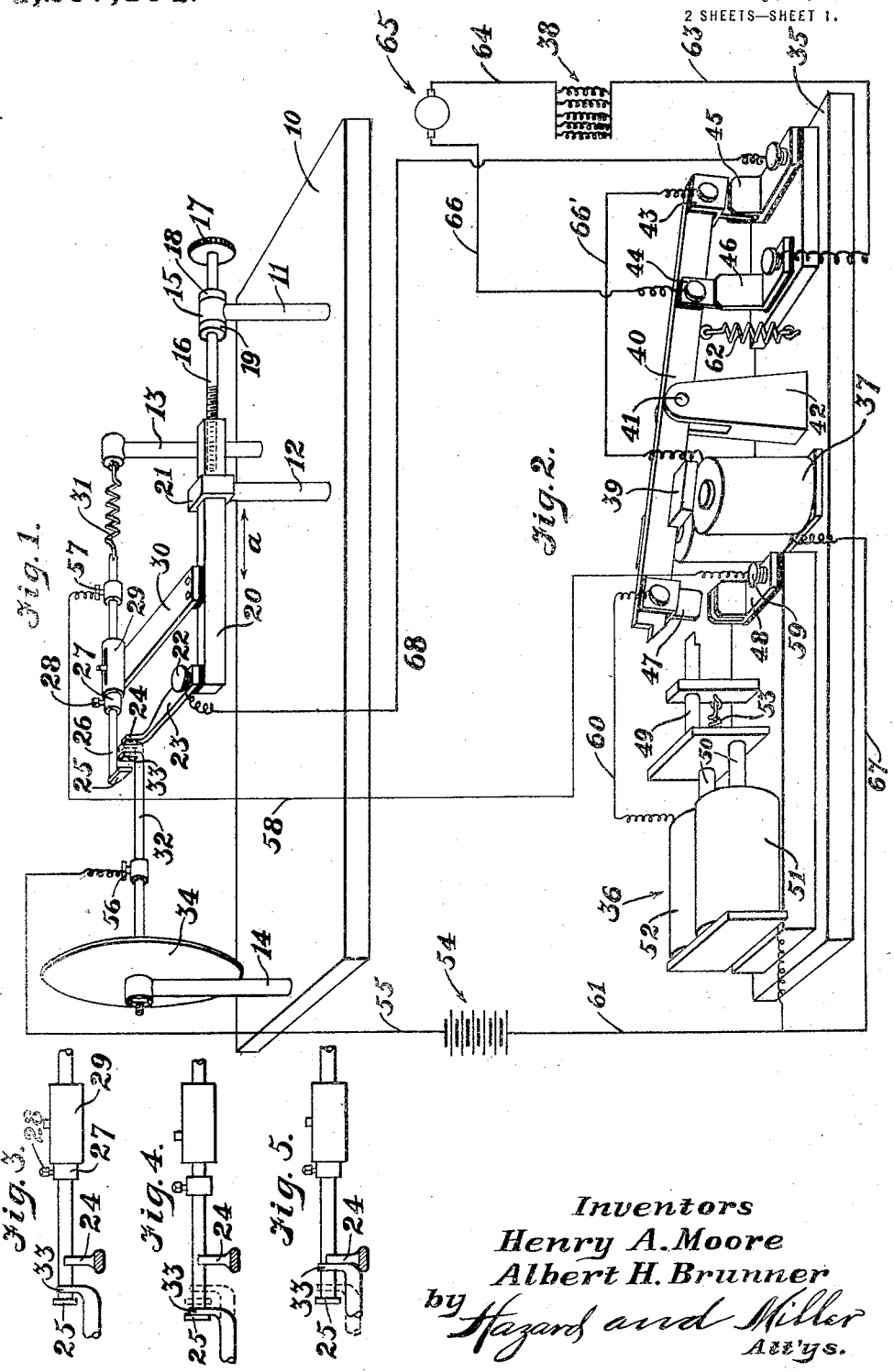

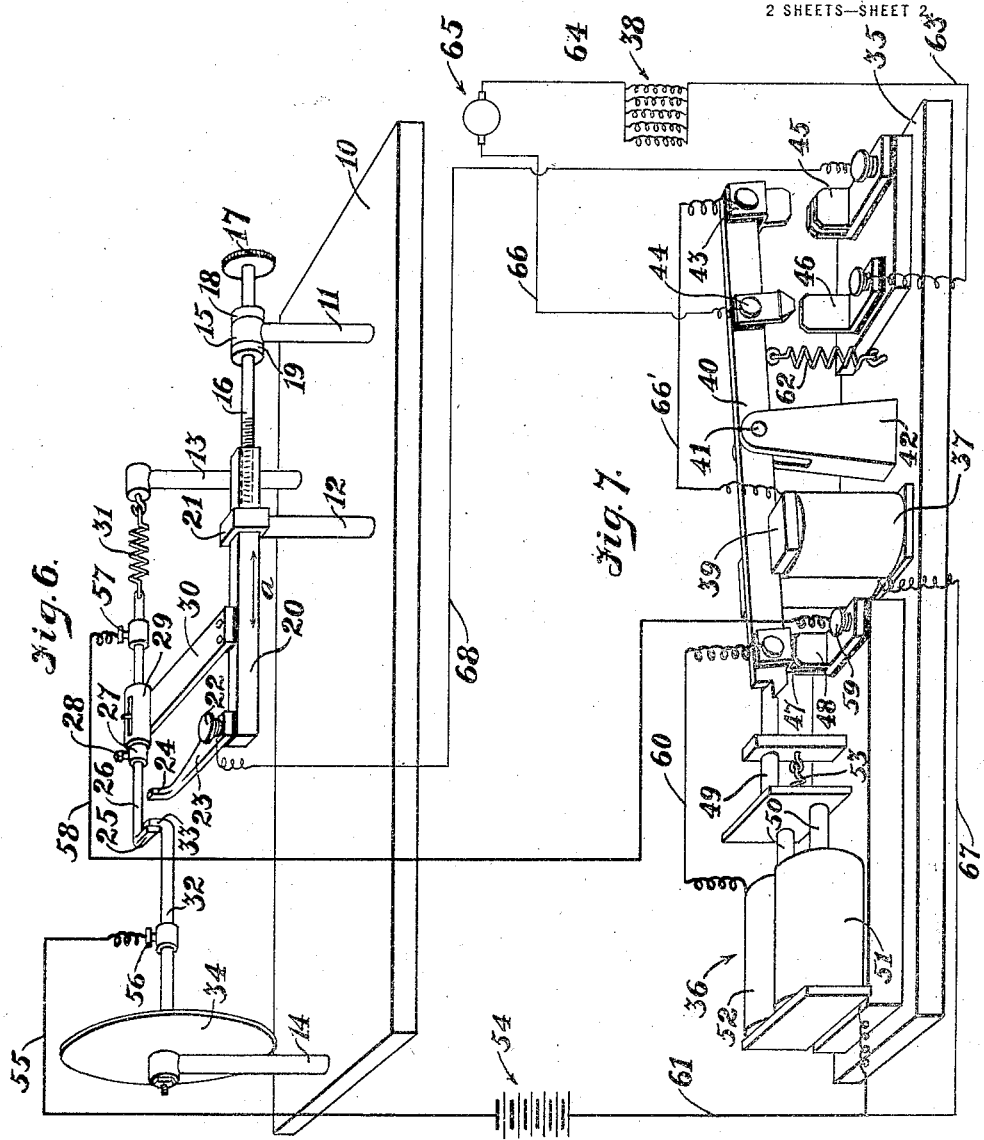

HENRY A. MOORE, OF BURBANK, AND ALBERT H. BRUNNER, OF LOS ANGELES, CALIFORNIA.

HEAT-CONTROLLING DEVICE.

1,267,104.  Specification of Letters Patent.  Patented May 21, 1918.

Application filed December 6, 1916. Serial No. 135,384.

*To all whom it may concern:*

Be it known that we, HENRY A. MOORE and ALBERT H. BRUNNER, citizens of the United States, residing at Burbank and Los Angeles, respectively, in the county of Los Angeles and State of California, have invented new and useful Improvements in Heat-Controlling Devices, of which the following is a specification.

This invention relates to an electrical apparatus and particularly pertains to an electrical thermostatic control adapted for use in incubators and the like.

It is the principal object of this invention to provide an automatically operating electric switch which is particularly adapted to be used in combination with a thermostat that is susceptible to the temperature produced by an electric heating element.

Another object of this invention is to provide an electric switch which will automatically establish and discontinue the flow of current through two separate electric circuits and will act to positively maintain either circuit in an operative condition until the switch is actuated by another electric impulse.

Another object of this invention is to provide an electrically operated switch which is wired in a manner to be directly interposed along the path of travel of the various circuits controlled thereby.

It is a further object of this invention to provide an electric switch which is simple in its operation, automatic in action and positive in its movement.

Other objects will appear hereinafter.

The invention is illustrated by way of example in the accompanying drawings in which:

Figure 1 is a view in perspective illustrating the thermostat element and the temperature adjustment therefor.

Fig. 2 is a view in perspective illustrating the electrical equipment required to establish and break the flow of current through the apparatus. As disclosed in the drawings, Figs. 1 and 2 are intended to be considered in combination so that the complete electrical circuits may be intelligently traced.

Fig. 3 is a view in side elevation of the make and break contact member by which the degree of heat is adjustably maintained in the heating element. This view discloses the members in an inoperative position.

Fig. 4 is a view similar to Fig. 3, illustrating the contact members in a position to reestablish the flow of current through the heating element.

Fig. 5 is a view similar to the two preceding views, illustrating the members in a relation to each other adapted to discontinue the flow of current through the heating element.

Figs. 6 and 7 are views of the thermostatic unit and the electrical apparatus as disclosed in superimposed relation to each other and particularly showing the correlation of the thermostat contact member to the electrical apparatus when the flow of current is discontinued, and at the instant prior to its reëstablishment through the heating element.

Referring more particularly to the drawings, 10 indicates a thermostat base, preferably formed of wood or other suitable dielectric material. The control switch with which the present invention is concerned may be operated in connection with various thermostats, however, an application of the device is here shown in connection with the thermostat which will now be described. Mounted upon the thermostat base and extending perpendicularly therefrom are uprights 11, 12, 13 and 14. The uprights 11 and 12 are spaced longitudinally along the board and in alinement with each other. The upright 11 is fitted with a tubular bearing 15, through which an adjusting screw 16 is adapted to be rotated by means of a thumb nut 17. This screw is provided with collars 18 and 19, which are fixed to it upon opposite sides of the bearing 15 and prevent horizontal movement of the screw. The thread end of the screw extends horizontally toward the standard 12 and engages the threaded bore of a rectangular supporting bar 20, which is reciprocally mounted within a bracket 21 fixed at the top of standard 12 and in horizontal alinement with the bearing 15 upon the standard 11. It will be seen that rotation of the screw 16 will advance and retract the supporting bar 20 in the directions indicated by arrow —*a*—. This bar is fitted with a binding post 22, mounted in its outer terminating end, said post being provided to secure an electrical conductor and also a contact finger 23 which extends at right angles to the bar and lies in approximately the same horizontal plane. The finger 23 is fitted with a contact tip 24 adapted to be in vertical and horizontal alinement with a tip 25 of a contact member 26. These tips are held in spaced relation to each other, and are adjusted by means of an adjusting sleeve 27, through which the cylindrical body of the finger 26 extends and is held by means of a screw 28. The sleeve 27 is reciprocally supported within a tubular bearing 29 fixed and supported by a supporting arm 30 secured to the bar 20. It will be noted that the finger 22 and the arm 30 are electrically insulated from the bar 20. The cylindrical body of the finger 26 extends through the sleeve 27 and the bearing 29 and is engaged at its end by a helical tension spring 31, which is secured at the upper end of standard 13.

Mounted in a manner to move horizontally between the contact tips 24 and 25 previously described, is a thermostat finger 32, fitted with a tip 33 and adapted to be alternately brought into contact with either of the tips 24 or 25 by the action of a thermostat diaphragm 34 mounted upon the standard 14. The expansion and contraction of the thermostat diaphragm will move the thermostat finger 32 to establish or discontinue the flow of electrical current through the apparatus, as will hereafter be described.

Reference being had to Fig. 2 of the drawings, it will be seen that upon a suitable base 35 are positioned an electrical solenoid 36 and magnetic coils 37. These two electrical units are provided to establish and discontinue the flow of electrical current through an electrical heating element 38 suitably positioned at any adjacent or remote point as desired. The magnetic coils 37 are positioned to extend vertically and to act upon a magnetic bar 39 suspended above the coils and fixed to a rocker arm 40, mounted upon a pivot pin 41, which extends through an upright 42 resting on a base 35. This rocker arm extends from both sides of its pivotal center its rear end being fitted with knife switch members 43 and 44, which in turn may be brought into contact with contact members 45 and 46 dielectrically mounted upon the base. The forward end of the rocker arm is fitted with a knife blade 47 adapted to be brought into contact with contact member 48. Mounted adjacent the forward end of the rocker arm is a lock pin 49 which may be reciprocated by magnetic cores 50 slidably mounted within the solenoid coils 51 and 52. A helical spring 53 is provided to draw the pin 49 to its outermost position.

In operation it will be assumed that the thermostatic apparatus is mounted with the thermostat finger 32 in an intermediate position, so that the contact tip 33 will be out of contact with both the tips 24 and 25. The device may thereafter be adjusted by experiment so that the tips 24 and 25 will bear proper relation to the finger 32 and its movement, and thus provide means to establish and discontinue an electrical circuit through the heating element 38. After adjustment the tip 33 should bear against the tip 25 as disclosed in Figs. 4 and 6 of the drawings. In this position electrical current from a suitable battery 54 will be carried by conductor 55 to a binding post 56 mounted upon the thermostat finger 32. The current will then pass through the tip of the finger and along the finger 26 through a binding post 57 to a conductor 58. This conductor leads to binding post 59 of contact member 48, from whence the current passes through knife blade 47 to a conductor 60 leading to the solenoid 36, after which it returns through a return conductor 61 to the source of power 54. It will thus be seen that in this electrical circuit the solenoid will be actuated to withdraw its locking bar 49 out of movement with the end of the locking arm 40 and permit a helical coil 62 to draw the arm up from contact with the member 48 and produce contact between members 44 and 46 and 43 and 45 respectively.

This will instantly establish a current from member 46 through a conductor 63 to the heating element 38 and place the electrical units in the position shown in Fig. 2. Conductor 64 leads from the heating element to one pole of a source of electrical supply 65, the opposite pole of this source being connected by conductor 66 which leads to the knife blade 44 and completes the circuit as will be understood. Simultaneously the knife blade 43 in making contact with member 45 will establish a circuit through a conductor 66' to the electromagnets 37 and this will travel along a conductor 67 to one side of the source of electrical energy 54. The circuit is completed by the current passing along conductor 55 from the source of energy 54, through the thermostat finger 32 to the finger 23 and from thence along conductor 68 to the contact member 45, thus completing a second circuit and acting to draw the forward end of the rocker bar down upon the electromagnets to become locked by the locking pin 49, which normally is held out in an engaging position and is released from engagement by the solenoids. In this manner it will be seen that by proper adjustment of the contact tips 24 and 25 of fingers 23 and 26 respectively, the degree of heat maintained by the heating element 38 will be limited to slight variations only, and that the thermostat apparatus will only require electrical energy from the battery 54 at the instant of operation, after which it will be inoperative both mechanically and electrically, until the thermostat is expanded or contracted to complete the circuit as described.

It will thus be seen that the electrical thermostat control for electric heating elements here disclosed provides a simple and effective control mechanism for use in devices such as incubators and does not require the attention of a skilled operator.

While we have shown the preferred form of our invention as now known to us, it will be understood that various changes in the combination, construction and arrangement of parts may be made by those skilled in the art, without departing from the spirit of the invention.

We claim:

1. An electric switch, comprising a base, a rocker arm pivotally mounted upon said base for vertical movement, contact members mounted upon one end of said arm and adapted to be included within an electric circuit, contact members mounted upon the other end of said arm and adapted to be included within a second electric circuit, separate switches included within each of said circuits, an electro-magnet included within the second-named circuit whereby its energization will separate the contact members of said circuit and connect the contact members of the first-named circuit, a catch adapted to engage the rocker arm in a manner to hold said contact members in position, and an electro-magnet included within said first-named circuit whereby the closing of the switch in said circuit will release said catch and the rocker arm, and positively acting means for breaking the contact of said contact members of the first-named circuit and reëstablishing the contact of the contact members of the second-named circuit.

2. An electric switch comprising a base, a pair of electric magnets positioned thereupon, a rocker-arm pivotally mounted above one of said magnets and adapted to be influenced thereby, a pair of fixed contacts mounted upon the base and adjacent one end of said rocker-arm, a pair of contact members mounted upon one end of said arm and adapted to simultaneously engage said fixed contact members, a primary electric circuit including one of said fixed contact members and one of the movable ones, a secondary circuit including the magnet controlling said rocker-arm and the other of said fixed and movable contact members, an individual switch included within said secondary circuit, a movable contact member mounted upon the opposite end of said rocker-arm, a fixed contact member mounted upon the base and adapted to be engaged by said last-named movable member, a second secondary electric circuit including said last-named fixed and movable contact members and the other electric magnet, an individual switch included within said second-named secondary circuit, and interlocking members controlled by the first and second electric magnets, whereby the closing of the individual switch in the first-named secondary circuit will cause its circuit and the primary circuit to be broken and the secondary circuit closed and locked, and whereby the closing of the individual switch in the second secondary circuit will cause said circuit to be broken and the primary and first secondary circuits to be reëstablished.

In testimony whereof we have signed our names to this specification.

HENRY A. MOORE.
ALBERT H. BRUNNER.